US005575409A

United States Patent [19]

Gruendeman

[11] Patent Number: 5,575,409

[45] Date of Patent: Nov. 19, 1996

[54] STATIC MIXER NOZZLE CONFIGURATION THAT REMOVABLY RECEIVES A LOCKING HUB THEREON

[75] Inventor: Peter E. Gruendeman, Allentown, N.J.

[73] Assignee: Terry A. Horner, Allentown, N.J.

[21] Appl. No.: 393,230

[22] Filed: Feb. 23, 1995

[51] Int. Cl.[6] ..... B65D 83/00; F16L 25/00

[52] U.S. Cl. ..... 222/459; 222/567; 239/600; 285/328; 285/382.1; 285/395; 403/348

[58] Field of Search ..... 222/145.6, 459, 222/567, 568, 570; 239/390, 397, 600; 403/348; 285/358, 359, 328, 382, 382.1, 360, 394, 395, 401

[56] References Cited

U.S. PATENT DOCUMENTS

| | | | |
|---|---|---|---|
| 4,361,196 | 11/1982 | Hoyle, Jr. | 285/401 X |
| 4,538,920 | 9/1985 | Drake | 222/145.6 X |
| 5,033,650 | 7/1991 | Colin et al. | 222/459 X |
| 5,326,036 | 7/1994 | Wilger | 239/600 |
| 5,462,317 | 10/1995 | Keller | 222/568 X |

*Primary Examiner*—Robert J. Oberleitner
*Assistant Examiner*—Kevin D. Rutherford
*Attorney, Agent, or Firm*—Davis and Bujold

[57] ABSTRACT

A nozzle configuration for a static mixer having a retaining shoulder with a square cross-section, an inclined front face and a flat retaining face that is normal to the longitudinal axis of the nozzle. An undercut having a octagonal cross-section is provided immediately adjacent to the retaining face. The faces of the undercut alternately define access surfaces, that are in the same plane as and join with corresponding outer edges of the retaining shoulder, and locking surfaces that undercut the corners of the retaining shoulder for retaining a locking hub on the nozzle. Travelling clockwise around the undercut, each locking face is inclined relative to the preceding access face at an angle of 40° such that it is harder to unlock a locking hub in the clockwise direction than it is to lock it. The distance between opposing locking surfaces is greater than the distance between opposing sides of a square mounting hole in a conventional locking hub in order to securely retain a locking hub in the locked position.

15 Claims, 3 Drawing Sheets

STATIC MIXER NOZZLE CONFIGURATION THAT REMOVABLY RECEIVES A LOCKING HUB THEREON

FIELD OF THE INVENTION

The invention pertains to a nozzle that is configured to removably receive a locking hub thereon, particularly, to a nozzle for a static mixer that is sized and shaped to removably receive a locking hub for connecting accessories, such as needles, extensions, hoses etc., to the mixer.

BACKGROUND OF THE INVENTION

Nozzles for dispensing fluids such as adhesives, lubricants, etc. often require the attachment of accessories, for example, needles, extensions, hoses etc. These accessories are typically attached to the nozzle of a static mixer with an existing internally threaded locking hub that is mounted to the nozzle. Presently existing locking hubs have a round or square mounting hole passing therethrough that is sized and shaped to snap over a correspondingly shaped retaining shoulder that is integrally formed on the nozzle. The accessories are then threaded into the internal threads in the locking hub, thereby attaching the accessories to the nozzle.

Once the locking hub is snapped onto a conventional nozzle on a static mixer, it cannot be removed without permanently damaging the retaining shoulder and/or the locking hub. Therefore, once a locking hub is removed from a conventional static mixer nozzle, the hub and/or the static mixer cannot be reused.

There is a need for a nozzle tip that can securely retain a standard locking hub in a manner such that the locking hub can be easily removed from the nozzle without damaging the nozzle or the locking hub.

SUMMARY OF THE INVENTION

It is an object of the present invention to provide a nozzle for a static mixer that is configured to securely receive a standard locking hub thereon for connection to accessories in a manner such that the locking hub is easily removed from the nozzle. This and other objectives are achieved by the present invention by a static mixer nozzle configuration for releasably receiving a locking hub thereon, said nozzle comprising an enlarged retaining shoulder having a symmetrical cross section for receiving a said locking hub having a corresponding symmetrical mounting opening thereover; and an undercut having a symmetrical cross section located immediately adjacent said shoulder remote from a tip of said nozzle; wherein faces of said undercut alternately define access surfaces corresponding to said retaining shoulder's symmetrical cross-section for receiving a said locking hub in an access position, and locking surfaces, corresponding to said mounting opening, that undercut the corners of said shoulder for positively retaining said locking hub on said nozzle upon rotation of said hub in a locking direction to a locking position in which the corners of said shoulders overlie a base of said locking hub.

Further objectives are achieved by a static mixer nozzle configuration for releasably receiving a locking hub thereon, said nozzle comprising an enlarged retaining shoulder having a square cross section that is sized to receive a said locking hub having a square mounting opening, over said retaining shoulder; an undercut having an generally octagonal cross-section located immediately adjacent said shoulder remote from a tip of said nozzle; and wherein the generally octagonal cross-section consists of surfaces of said undercut alternately defining access surfaces, that are in the same plane as and join with outermost edges of said shoulder, for receiving a said locking hub thereover in an access position, and locking surfaces that undercut the corners of said shoulder; wherein in a locking direction around said undercut, each of said locking surfaces is inclined relative to a preceding access surface at an angle that is less than 45 degrees.

It is a further object of the invention to provide a static mixer nozzle for releasably receiving a locking hub thereon, said mixer nozzle comprising a nozzle having an enlarged retaining shoulder and an undercut located immediately adjacent said shoulder remote from a tip of said nozzle; a locking hub having a mounting opening for releasably locking said hub to said nozzle, said mounting opening having a shape such that when rotated within said undercut, said hub engages said nozzle in a locking fashion, said retaining shoulder being similarly shaped with said mounting opening; and, wherein faces of said undercut alternately define access surfaces for receiving said locking hub in an access position, and locking surfaces, defined by said undercut, for positively retaining said locking hub on said nozzle upon rotation of said hub in a locking direction to a locking position in which a portion of said shoulder overlies a base of said locking hub.

BRIEF DESCRIPTION OF THE DRAWINGS

The invention will now described, by way of example, with reference to the accompanying drawings, in which.

DETAILED DESCRIPTION OF THE INVENTION

Figure 1:
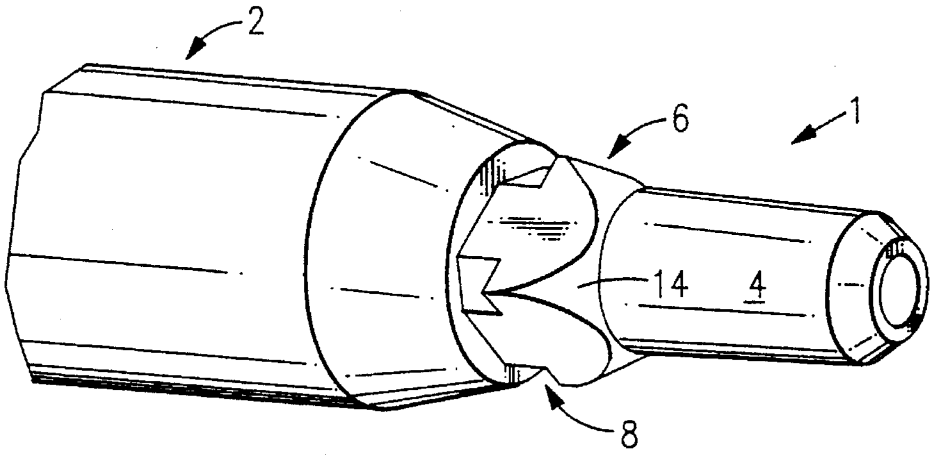
FIG. 1 is a perspective view of a nozzle according to the invention.
Figure 2:
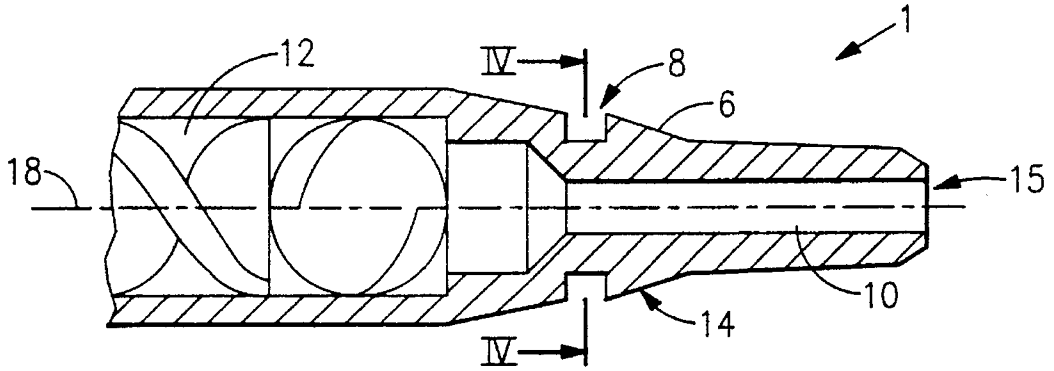
FIG. 2 is a cross-sectional side view of the nozzle of FIG. 1.

A nozzle according to the invention is illustrated in FIGS. 1–5. The nozzle 1 may be either integrally formed with a cylindrical body of a static mixer 2, as shown in the Figures, or it may be formed as a separate component that is attached to a static mixer by any appropriate attachment means.

The nozzle 1 comprises a nozzle tip 4 having a retaining shoulder 6 formed integrally therewith and extending therefrom and an undercut 8 located immediately behind the retaining shoulder 6. A central channel 10 extends longitudinally through the nozzle tip 4, so that material passing through the static mixer 2 can exit out the end 15 of the nozzle tip 4 by passing through channel 10.

Figure 6:
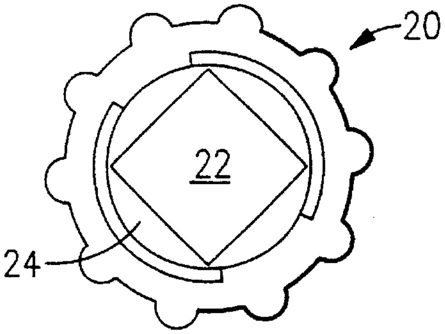
FIG.6 Prior Art
FIG. 6 is an end view of a conventional locking hub.

The retaining shoulder 6 has a square cross-section, a tapered front face 14 and a flat retaining face 16 that is perpendicular to a longitudinal axis 18 of the nozzle 1. The front face 14 of the retaining shoulder 6 is tapered to facilitate the mounting of a locking hub 20, FIG. 6, onto the nozzle 1. The outermost edges of the retaining shoulder 6 are preferably 4.57 mm (0.180 inches) square, which is slightly smaller than the square mounting opening 22 of FIG. 6 in a conventional locking hub 20, which opening is typically 4.7 mm (0.185 inches) square. With this construction, the locking hub is easily passed over the retaining shoulder 6 and into the area of the undercut 8 as shown in FIG. 7.

Figure 4:
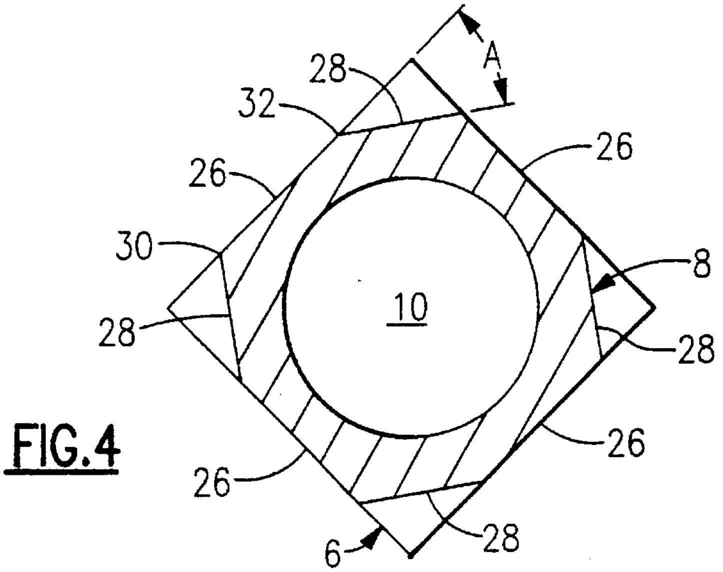
FIG. 4 is a cross-section taken along line IV—IV in FIG. 2.
Figure 5:
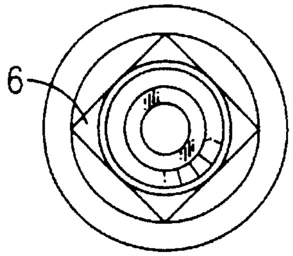
FIG. 5 is an end view of the nozzle of FIG. 1 without a locking hub thereon.

In order to rotatably lock the locking hub 20 on the. nozzle 1 in a locking position, the undercut 8 has a substantially octagonal cross-section as can be seen in FIGS. 1 and 4. The peripheral radially outwardly facing surfaces of the undercut alternately define access surfaces 26 and locking surfaces 28.

The access surfaces 26 extend parallel to the longitudinal axis 18 of the nozzle in the same planes as the outermost edges of the retaining shoulder 6 and form integral planar extensions of the retaining shoulder as is best seen in FIG. 1. Thus, the distance between opposing access surfaces 26 is the same as the distance between opposing edges of the retaining shoulder 6, i.e. 4.57 mm (0.180 inches). In this way, the locking hub 20 freely passes over the retaining shoulder 6, and the access surfaces 26 of the undercut 8, and is received in the undercut 8 in the access position as shown in FIG. 7.

Figure 3:
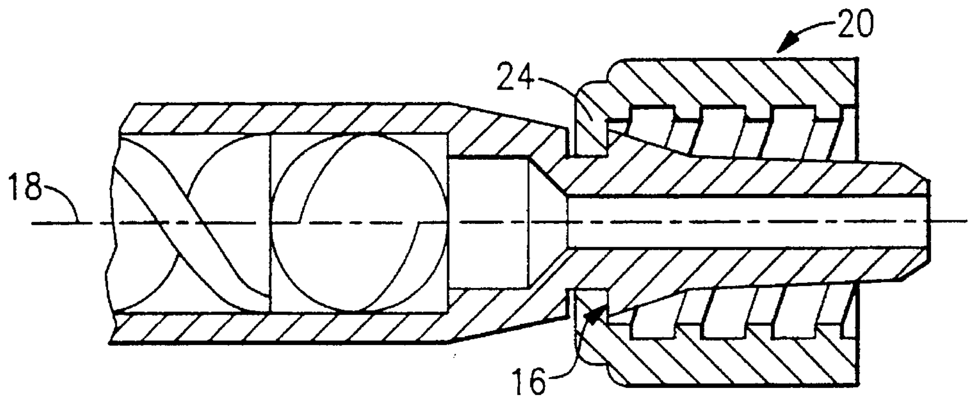
FIG. 3 is a cross-sectional side view as in FIG. 2 showing a locking hub locked in place on the nozzle.
Figure 7:
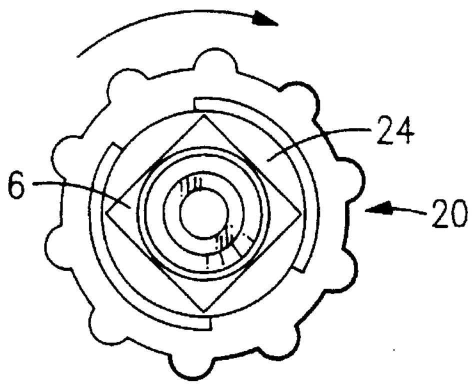
FIG. 7 is an end view of the nozzle of FIG. 1 with a locking hub, as shown in FIG. 6, mounted thereon in an unlocked access position.
Figure 8:
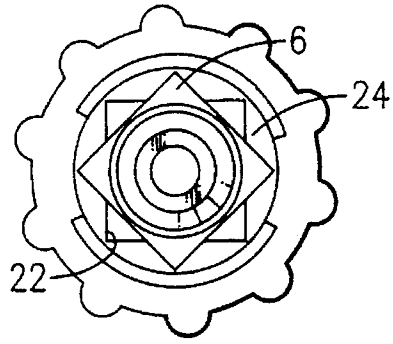
FIG.8 is an end view of the nozzle of FIG. 1 showing the locking hub mounted on the nozzle in a locked position as shown in FIG. 3.

The locking hub 20 is mounted on the nozzle 1 by first rotationally aligning the mounting opening 22 in the locking hub 20 with the retaining shoulder 6 and passing the locking hub 20 over the retaining shoulder 6 until the base 24 of the locking hub 20 is received in the undercut 8 in an access position as shown in FIGS. 7. To lock the hub 20, the locking hub 20 is then rotated clockwise, as indicated by the arrow in FIG. 7, until the sides of the mounting opening 20 are parallel to the locking surfaces in a locking position. In the locking position the corners of the retaining shoulders 6 overlie the base 24 of the locking hub 20, thereby positively retaining the locking hub 20 in place on the nozzle 1 in a locking position as shown in FIGS. 3 and 8. In order for the locking hub 20 to be rotatable from one surface to the next in the undercut 8, either the locking hub 20 or the undercut 8 must be formed of a sufficiently resilient material, such as a suitable plastic.

The distance between opposing locking surfaces 28 is preferably 4.85 mm (0.191 inches), which is slightly larger than the distance across the mounting opening 22 in the locking hub 20. With this construction, the locking hub 20 is tightly held, with an interference fit, in place on the locking surfaces 28 and will not unintentionally turn on the nozzle 1 to the access position and fall off the nozzle 1.

Traveling clockwise around the undercut from an axis surface 26 to an adjoining locking surface 28, each locking surface 28 is inclined relative to each preceding access surface 26 at an angle A of 40°, see FIG. 4. Continuing clockwise around the undercut 8 from a locking surface 28 to an access surface 26, each access surface 26 is inclined relative to each preceding locking surface 28 at an angle of 50°. With this construction a larger torque is required to unlock the locking hub 20 by rotating it clockwise from the locking position to the access position, than it is to lock the locking hub by rotating it clockwise from the access position to the locking position.

Since the force required to lock the hub 20 in the clockwise direction is less than that required to unlock it, overshoot is prevented when locking the locking hub 20. If the angles between all the faces were 45°, then torque has to be carefully applied to the locking hub 20 when locking it on the nozzle. If too much force is applied with 45° angles the excess force may well cause the locking hub 20 to over rotate, passing the locking surfaces and overshooting the locking position, and come to rest back in the unlocked access position.

The difference in torque required to rotate the locking hub into the locking position and into the access position may be varied by varying the angles between the faces of the undercut. For example, the angle of inclination of a locking surface 28 relative to the preceding access surface 26 can be anywhere from 10° to 45°, preferably less than 45° so that more torque is required to rotate the locking hub clockwise out of the locking position than to rotate it into the locking position for preventing overshoot. Preferably this angle is between 35° and 45° and more preferably is 40°±2° and most preferably is about 40°.

It can be appreciated that the smaller angle can be located traveling counter-clockwise around the undercut from an access surface 26 to a succeeding locking surface 28, thereby providing a left handed or counter-clockwise turning motion for locking the locking hub 20 in place on the nozzle 1.

The present invention provides for a square retaining shoulder 6 so that presently available, standard locking hubs 20 having square mounting openings 22 may be used with nozzles 1 according to the present invention. However, it can be appreciated that the retaining shoulder may have any number of sides, as long as it corresponds with the size and shape of the mounting opening in a corresponding locking hub. The under cut must always have a multiple, usually twice, as many sides as the mounting opening in a corresponding locking hub, so that there is a locking surface located intermediate each access surface for locking the hub in the locking position.

Figure 9:
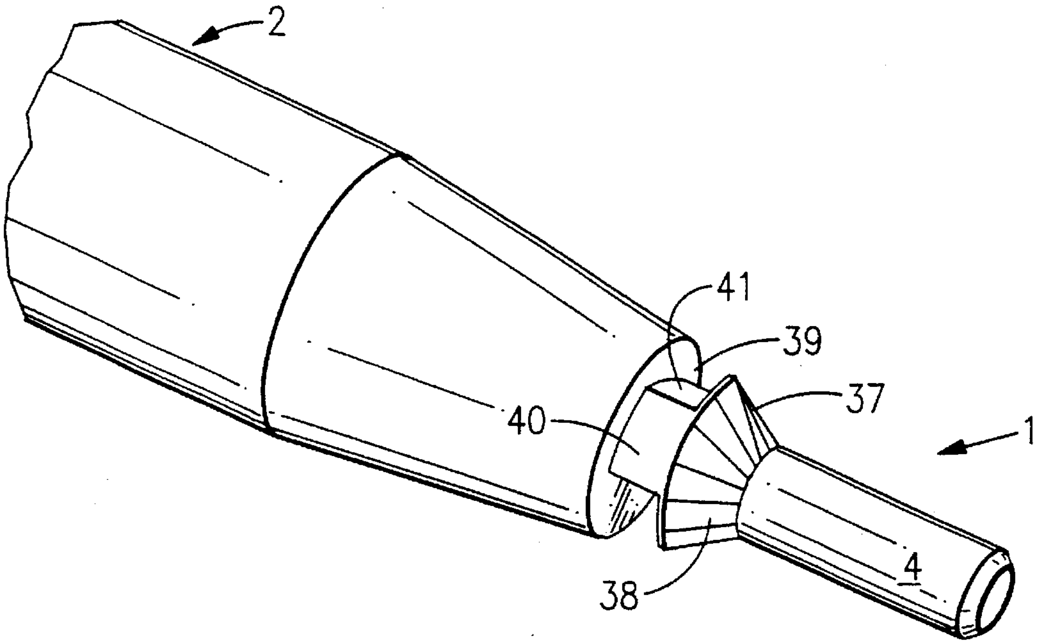
FIG. 9 is a perspective view of a second embodiment of the nozzle of the present invention.
Figure 10:
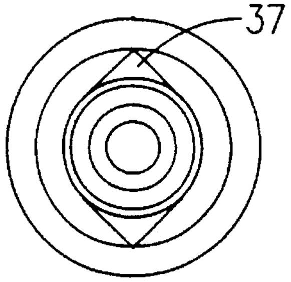
FIG. 10 is an end view of the nozzle of FIG. 9 without a locking hub thereon.
Figure 11:
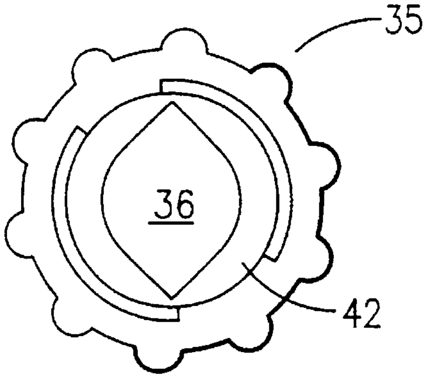
FIG. 11 is an end view of a locking hub of the present invention.
Figure 12:
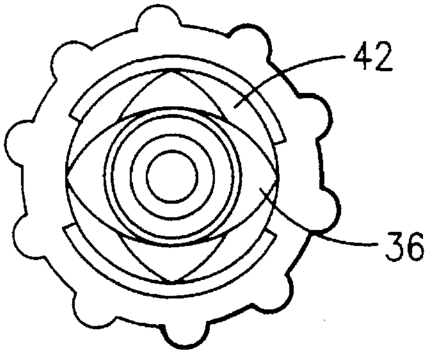
FIG. 12 is an end view of the nozzle of FIG. 9 showing the locking hub of FIG. 11 mounted thereon.

Turning now to FIGS. 9–12, there is shown an alternative embodiment of the present invention. Rather than use a standard locking hub 20, a custom locking hub 35 having a curved mounting opening 36 (FIG. 11) is used with a similarly shaped retaining shoulder 37 of the nozzle 1 (FIGS. 9 and 10). The retaining shoulder 37 has inclined faces 38 to facilitate mounting of the locking hub 35. An undercut 39 is also provided in the nozzle 1 wherein faces of the undercut alternately define access surfaces 40 for receiving the locking hub 35 in an access position, and locking surfaces 41, defined by the undercut 37, for positively retaining the locking hub 35 on the nozzle 1 upon rotation of the locking hub 35 in a locking direction to a locking position. In this embodiment, the mounting opening 36 is aligned with the retaining shoulder 37 so that the locking hub 35 may be placed onto the nozzle 1. The locking hub 35 is then rotated 90° to lock the locking hub 35 in place (FIG. 12) such that a portion of the shoulder 37 overlies a base 42 of the locking hub 35. As will be apparent to one of ordinary skill in the art, the mounting opening 36 may be shaped such that the locking hub 35 must be rotated 180° to lock the locking hub 35 relative to the nozzle 1. This may be accomplished by, for example, providing a mounting opening and a similarly shaped shoulder having one curved side and one flat side rather than two curved sides as shown in FIGS. 9–12. Indeed, by strategically positioning the locking surface 41 in the undercut 39, any degree of rotation may be provided to rotate the locking hub in a locking direction to a locking position.

What is claimed is:

1. A static mixer nozzle configuration for releasably receiving a locking hub thereon, said nozzle comprising:

an enlarged retaining shoulder having a symmetrical cross section for receiving a said locking hub having a corresponding symmetrical mounting opening thereover; and an undercut having a symmetrical cross section located immediately adjacent said shoulder remote from a tip of said nozzle;

wherein faces of said undercut alternately define access surfaces corresponding to said retaining shoulder's symmetrical cross-section for receiving a said locking hub in an access position, and locking surfaces, corresponding to said mounting opening, that undercut the corners of said shoulder for positively retaining said locking hub on said nozzle upon rotation of said hub in a locking direction to a locking position in which the corners of said shoulders overlie a base of said locking hub.

2. A nozzle according to claim 1, wherein traveling in said locking direction around said undercut, each of said locking surfaces is inclined relative to a preceding access surface at a first angle of less than 360 divided by the number of locking surfaces plus the number of access surfaces.

3. A nozzle according to claim 1, wherein the transverse distance between opposing locking surfaces is greater than a transverse distance between opposing sides of a said mounting opening whereby an interference fit is created between the hub and the undercut when in the locking position.

4. A static mixer nozzle configuration for releasably receiving a locking hub thereon, said nozzle comprising:

an enlarged retaining shoulder having a square cross section that is sized to receive a said locking hub having a square mounting opening, over said retaining shoulder;

an undercut having a generally octagonal cross-section located immediately adjacent said shoulder remote from a tip of said nozzle; and wherein the generally octagonal cross-section consists of surfaces of said undercut alternately defining access surfaces, that are in the same plane as and join with outermost edges of said shoulder, for receiving a said locking hub thereover in an access position, and locking surfaces that undercut the corners of said shoulder; wherein in a locking direction around said undercut, each of said locking surfaces is inclined relative to a preceding access surface at an angle that is less than 45 degrees.

5. A nozzle configuration according to claim 4, wherein said inclination is from 10 to less than 45 degrees.

6. A nozzle configuration according to claim 5, wherein said inclination is from 35 to less than 45 degrees.

7. A nozzle tip according to claim 6, wherein said inclination is about 40 degrees.

8. A nozzle configuration according to claim 4, wherein the transverse, locking, distance between opposing locking surfaces is greater than a transverse, mounting, distance between opposing sides of a said mounting opening whereby an interference fit is created between the hub and the undercut when in the locking position.

9. A nozzle configuration according to claim 8, wherein the traverse, access distance between opposing access surfaces is 4.57 mm. (0.180 inches), said locking distance is 4.85 mm. (0.191 inches) and said mounting distance is 4.7 (0.185 inches).

10. A nozzle configuration according to claim 9, wherein said inclination is from 10 to less than 45 degrees.

11. A nozzle configuration according to claim 10, wherein said inclination is from 35 to less than 45 degrees.

12. A nozzle configuration according to claim 11, wherein said inclination is about 40 degrees.

13. A static mixer nozzle for releasably receiving a locking hub thereon, said mixer nozzle comprising:

a nozzle having an enlarged retaining shoulder and an undercut located immediately adjacent said shoulder remote from a tip of said nozzle;

a locking hub having a mounting opening for releasably locking said hub to said nozzle, said mounting opening having a shape such that when rotated within said undercut, said hub engages said nozzle in a locking fashion, said retaining shoulder being similarly shaped with said mounting opening; and, wherein faces of said undercut alternately define access surfaces for receiving said locking hub in an access position, and locking surfaces, defined by said undercut, for positively retaining said locking hub on said nozzle upon rotation of said hub in a locking direction to a locking position in which a portion of said shoulder overlies a base of said locking hub.

14. A nozzle according to claim 13 wherein said retaining shoulder and said mounting opening each have two curved sides for requiring said locking hub to be rotated 90° to the locking position.

15. A nozzle configuration according to claim 14 wherein the transverse, locking, distance between opposing locking surfaces is greater than a transverse, mounting, distance between opposing sides of said access surfaces whereby an interference fit is created between the hub and the undercut when in the locking position.

* * * * *